United States Patent [19]

Sugimoto et al.

[11] Patent Number: 5,252,638
[45] Date of Patent: Oct. 12, 1993

[54] CASTING RESIN COMPOSITION

[75] Inventors: Toshio Sugimoto; Sadahiko Kawaguchi; Hiroshige Mori, all of Yokkaichi, Japan

[73] Assignee: Mitsubishi Petrochemical Co., Ltd., Tokyo, Japan

[21] Appl. No.: 747,966

[22] Filed: Aug. 21, 1991

[51] Int. Cl.$^5$ ............................................. C08L 63/04
[52] U.S. Cl. .................................. 523/427; 523/428; 523/458
[58] Field of Search ............................ 523/427, 428

[56] References Cited

U.S. PATENT DOCUMENTS

| 4,608,404 | 8/1986 | Gardner et al. | 523/458 |
| 4,814,414 | 3/1989 | Newman-Evans | 523/428 |

FOREIGN PATENT DOCUMENTS

| 0412891 | 2/1991 | European Pat. Off. . | |
| 412891 | 2/1991 | European Pat. Off. . | |
| 40657 | 12/1970 | Japan | 523/458 |
| 7040687 | 12/1970 | Japan . | |
| 60-215013 | 10/1985 | Japan | 523/458 |
| 801826 | 9/1958 | United Kingdom . | |
| 1035695 | 7/1966 | United Kingdom . | |

OTHER PUBLICATIONS

C.A., May ed., "Epoxy Resins", (1988), p. 469.
Patent Abstracts of Japan, vol. 15, No. 231(C-0840), Jun. 12, 1991 & JP-A-3-072522, Mar. 27, 1991, S. Ishimura, et al., "Epoxy Resin Composition".

Primary Examiner—Melvyn I. Marquis
Assistant Examiner—D. Aylward
Attorney, Agent, or Firm—Oblon, Spivak, McClelland, Maier & Neustadt

[57] ABSTRACT

A casting resin composition curable with an epoxy resin curing agent is described, which comprises at least one kind of an epoxy resin selected from bisphenol A diglycidyl ether and bisphenol F diglycidyl ether, a tri-functional or tetra-functional liquid epoxy resin, and an iron powder, the ratio of the iron powder being from 60 to 80% by weight to the amount of the whole resin composition. The casting resin composition can give a cured product having a high hardness and an excellent abrasion resistance.

3 Claims, No Drawings

CASTING RESIN COMPOSITION

FIELD OF THE INVENTION

The present invention relates to a casting resin composition, and more particularly to a casting resin composition for producing a press mold for motorcar parts, etc., capable of giving a cured product having a high hardness and an excellent abrasion resistance.

BACKGROUND OF THE INVENTION

Parts of motorcars, such as doors, bonnets, etc., are made by press-molding a steel plate using a press mold. Since the press mold is expensive, for a mold for producing a small amount of the parts such as trials of these parts or parts for specific use, a zinc alloy mold is used. In the case of using the zinc alloy mold, the precision of almost the same as a design is obtained for small-sized parts but as a press mold for large-sized parts, there are problems that a casting strain is large and it is difficult to keep the precision.

As one of the solving means, a mold using a zinc alloy and a resin has been used. The mold using a zinc alloy and a resin is a mold prepared by making a base mold using a zinc alloy having a low melting point and capable of reusing by melting and forming a surface resin layer on the surface thereof by casting and since the base mold made of a zinc alloy can be reused, the cost for the press mold can be reduced as disclosed in JP-A-58-151925 (the term "JP-A" as used herein means an "unexamined published Japanese patent application").

Also, as the casting resin which is used for making the mold using a zinc alloy and a resin, an epoxy resin containing an iron powder has been generally used. However, a conventional mold using a zinc alloy and a resin has a disadvantage that the pressing number is restricted since if the pressing number for parts is increased, the surface of the resin is abraded and hence the casting resin which is used for making the mold using a zinc alloy and a resin has been desired to give a cured product excellent in abrasion resistance.

SUMMARY OF THE INVENTION

The object of this invention is, therefore, to provide a casting resin composition, in particular, a casting resin composition for mold capable of giving a cured product having a high hardness and an excellent abrasion resistance.

That is, according to the present invention, there is provided a casting resin composition curable with an epoxy resin curing agent, comprising at least one kind of an epoxy resin selected from bisphenol A diglycidyl ether and bisphenol F diglycidyl ether, a tri-functional or tetra-functional liquid epoxy resin, and an iron powder, the ratio of the iron powder being from 60 to 80% by weight to the amount of the whole resin composition.

DETAILED DESCRIPTION OF THE INVENTION

Then, the invention is explained in detail.

As one of the epoxy resins for the casting resin component of this invention, at least one kind of an epoxy resin selected from bisphenol A diglycidyl ether and bisphenol F diglycidyl ether is used. Since the epoxy resin is a di-functional resin and has a low viscosity, the resin is suitable for containing a filler, in particular an iron powder at a high concentration. However, since the epoxy resin is a di-functional resin, the cured product thereof is inferior in the strength, hardness and abrasion resistance.

Accordingly, in the casting resin composition of this invention, the foregoing epoxy resin is used together with a tri-functional or tetra-functional liquid epoxy resin to improve the hardness and the abrasion resistance of the cured product.

As a poly-functional epoxy resin, there are semi-solid form or solid form resins having a high viscosity, such as novolak epoxy resin. In general, when such a poly-functional epoxy resin having a high viscosity is used together with the foregoing di-functional epoxy resin, the hardness and the abrasion resistance of the cured product can be improved but the viscosity of the resin composition is increased to reduce the fluidity and also the working property thereof. By the reason described above, in this invention, a tri-functional or tetra-functional liquid epoxy resin is used together with the foregoing di-functional epoxy resin.

Particularly preferred examples of the tri-functional or tetra-functional liquid epoxy resin for use in this invention are tri-functional triglycidylaminophenol, and tetra-functional tetraglycidylxylenediamine, 1,3-bis(N,N'-diglycidylaminomethyl)cyclohexane, and tetraglycidylaminodiphenylmethane.

These tri-functional or tetra-functional liquid epoxy resins may be used singly or as a proper mixture thereof. The amount of the tri-functional or tetra-functional liquid epoxy resin is from 3 to 80% by weight, and preferably from 5 to 50% by weight to the total epoxy resins. If the amount of the liquid epoxy resin is too small, the hardness and the abrasion resistance of the cured product can not sufficiently been improved, while if the amount is too large, the cured product becomes brittle.

Then, the casting resin composition of this invention also contains an iron powder and the iron powder has a function of improving the abrasion resistance of the resin cured product. The content of the iron powder is from 60 to 80% by weight to the amount of the whole resin composition. If the content of the iron powder is too small, a sufficient improving effect of the abrasion resistance is not obtained, while if the content thereof is too large, the fluidity of the resin composition is reduced to reduce the working property thereof.

The casting resin composition of this invention, can, if necessary, other various kinds of additives such as a flame retarder, a coupling agent, a thixotropy imparting agent, a reactivity diluting agent, a leveling agent, a lubricant, a thickener, a sedimentation inhibitor, a defoaming agent, a dispersing agent, a adhesion imparting agent, a wetting agent, a dye, a pigment, a rust proofing agent, a corrosion inhibitor, etc., in addition to the aforesaid components. These additives are known in the field of the art (see JP-A-2-3414, etc.) and the details are omitted.

Also, the casting resin composition of this invention is cured using an epoxy curing agent and as the epoxy curing agent, generally known curing agents can be all used.

Practical examples of the epoxy curing agent are amines, modified amines, polyamide resins, acid anhydrides, and imidazoles. In these curing agents, polyamide resins, amines, modified amines, and imidazoles are preferred, and in particular, polyamide resins are preferred owing to the excellent room-temperature curing property. Epoxy curing agents may be used singly or as a proper mixture of them.

The epoxy curing agent is usually used by mixing with the casting resin composition of this invention but in the case of the curing agent having a room-temperature curing property, it is preferable that the curing agent is mixed with the casting resin composition directly before use.

An amount of the epoxy curing agent used varies depending on a kind of the epoxy curing agent. For example, the polyamide resins are used in an amount of about 50 to about 150 parts by weight per 100 parts by weight of the epoxy resin.

The casting resin composition of this invention is prepared by properly mixing the foregoing necessary components and additives which are, if necessary, used and kneading the mixture and for kneading, a kneader, a roller mixer, etc., can be properly used.

Then, the invention is described in more detail by referring to the following examples and comparison example.

EXAMPLE 1

By mixing 200 g of bisphenol A diglycidyl ether (Epikote 828, trade name, made by Yuka Shell Epoxy K.K.), 80 g of tetraglycidylxylenediamine (Tetrad X, trade name, made by Mitsubishi Gas Chemical Co., Ltd.), and 750 g of an iron powder (mean particle size 40 μm) with a kneader, a composition was obtained.

To 100 g of the composition was added 16 g of a polyamide resin (Tohmide 2500, trade name, Fuji Kasei Kogyo K.K.) as a curing agent, and after uniformly mixing, the composition was cured for 3 days at room temperature. The results of testing the hardness and the abrasion resistance of the cured product are shown in Table 1 below.

EXAMPLE 2

By mixing 200 g of bisphenol A diglycidyl ether (Epikote 828, trade name, made by Yuka Shell Epoxy K.K.), 80 g of triglycidylaminophenol, and 750 g of an iron powder (mean particle size 40 μm) with a kneader, a composition was obtained.

The composition was cured by the same method as in Example 1. The test results of the hardness and the abrasion resistance of the cured product are shown in Table 1 below.

EXAMPLE 3

By following the same procedure as in Example 1 except that bisphenol F diglycidyl ether (Epikote 807, trade name, made by Yuka Shell Epoxy K.K.) in place of bisphenol A diglycidyl ether, a composition was prepared. The composition was cured by the same manner as in Example 1. The test results of the hardness and the abrasion resistance of the cured product obtained are shown in Table 1 below.

COMPARISON EXAMPLE

By mixing 250 g of bisphenol A diglycidyl ether (Epikote 828, trade name, made by Yuka Shell Epoxy K.K.) and 750 g of an iron powder (mean particle size 40 μm) with kneader, a composition was obtained.

To 100 g of the composition was added 15 g of a polyamide resin (Tohmide 2500, trade name, made by Fuji Kasei Kogyo K.K.) as a curing agent and then the composition was cured by the same manner as in Example 1. The test results of the hardness and the abrasion resistance of the cured product are shown in Table 1 below.

TABLE 1

|  | Example | | | Comparison Example |
|---|---|---|---|---|
|  | 1 | 2 | 3 | 1 |
| Hardness[*1] | 91 | 90 | 90 | 83 |
| Abrasion Resistance(g)[*2] | 0.75 | 0.80 | 0.80 | 1.55 |

[*1]Shore 'D' durometer
[*2]Taper Type Abrasion Test Machine was used. The abrasion resistance was shown by the weight loss (g) by abrasion.

As is clear from Table 1, the cured product of the resin composition in each example of this invention is excellent in the hardness and the abrasion resistance as compared to the cured product in Comparison Example.

As described above, since the casting resin composition of the present invention has a high hardness and is excellent in abrasion resistance, the resin composition is excellent in a casting resin for a press mold.

While the invention has been described in detail and with reference to specific embodiments thereof, it will be apparent to one skilled in the art that various changes and modifications can be made therein without departing from the spirit and scope thereof.

What is claimed is:

1. A casting resin composition curable with an epoxy resin curing agent, consisting of at least one kind of an epoxy resin selected from the group consisting of bisphenol A diglycidyl ether and bisphenol F diglycidyl ether, a tri-functional or tetra-functional liquid epoxy resin which is at least one kind of an epoxy resin selected from the group consisting of triglycidylaminophenol, tetraglycidylxylenediamine, tetraglycidylaminodiphenylmethane, and 1,3-bis(N,N'-diglycidylaminomethyl)cyclohexane, and an iron powder, the ratio of the iron powder being from 60 to 80% by weight of the amount of total epoxy resins and iron powder, and the amount of the tri-functional or tetra-functional liquid epoxy resin being from 5 to 50% by weight of the total epoxy resins, said curing agent comprising a polyamide resin in an amount of from 50 to 150 parts by weight per 100 parts by weight of epoxy resin.

2. The casting resin composition as in claim 1, wherein the iron powder has a mean particle size of 40 μm.

3. A cured casting resin composition prepared by curing the composition as in claim 1.

* * * * *